Sept. 16, 1930.  A. SCHRELLE ET AL  1,775,972
DRAWING AND PUSHING DEVICE FOR CENTRAL COUPLINGS OF VEHICLES
Filed March 22, 1928
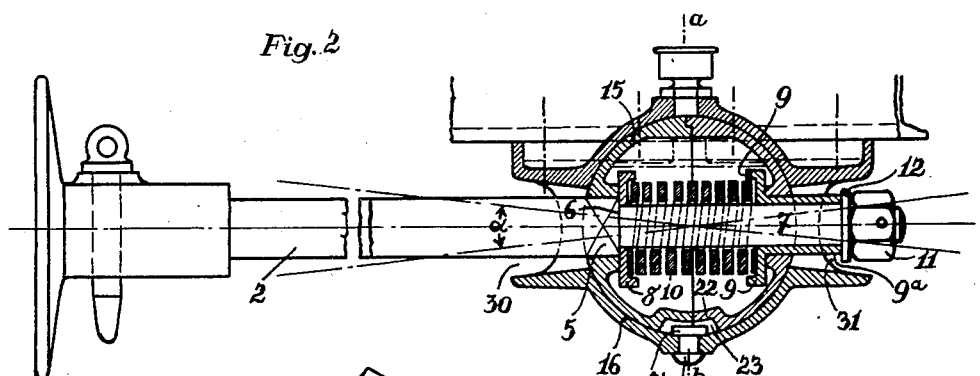
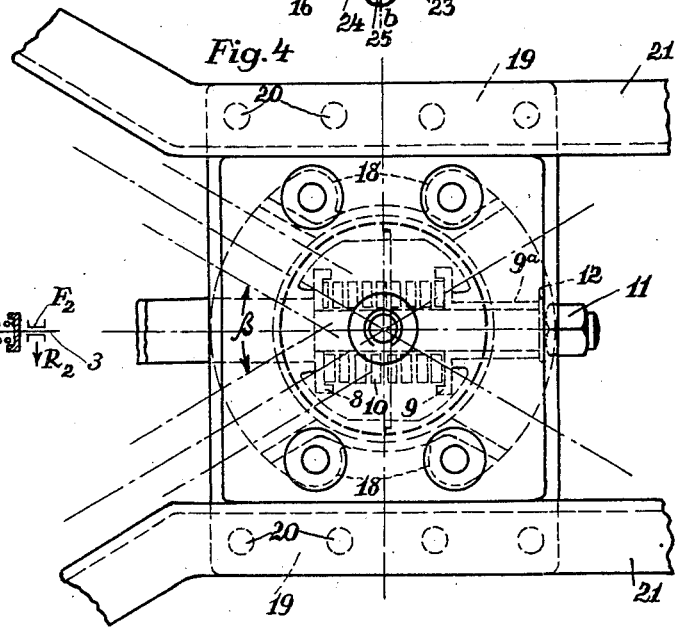
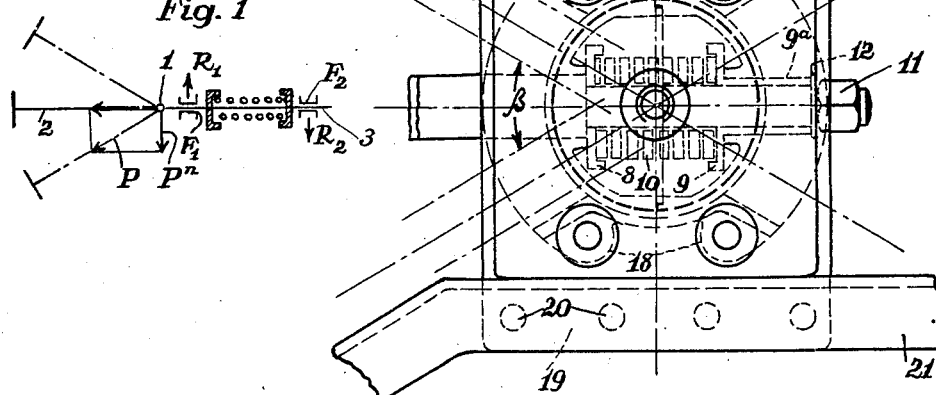
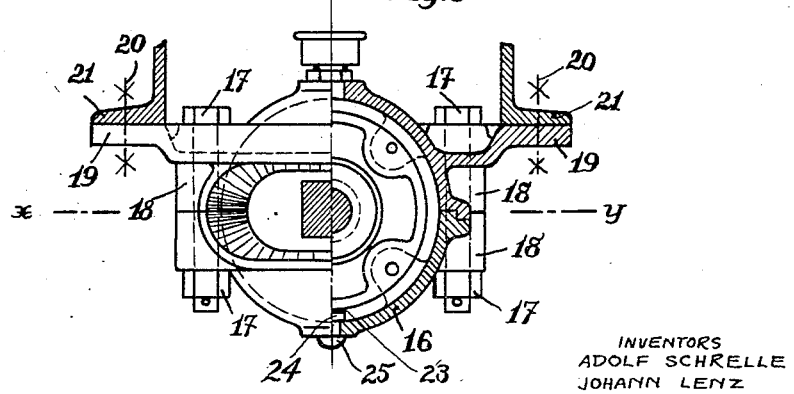
INVENTORS
ADOLF SCHRELLE
JOHANN LENZ
By George L. Sachs
ATTORNEY Patented Sept. 16, 1930

1,775,972

UNITED STATES PATENT OFFICE

ADOLF SCHRELLE AND JOHANN LENZ, OF VIENNA, AUSTRIA

DRAWING AND PUSHING DEVICE FOR CENTRAL COUPLINGS OF VEHICLES

Application filed March 22, 1928, Serial No. 263,738, and in Austria March 3, 1927.

Some known drawing and pushing devices for central couplings of vehicles consist, as diagrammatically shown in Fig. 1, of a spring loaded drawing bolt 2 to which is pivotally secured a buffer-rod 3 by means of a bolt 1. This arrangement possesses the drawback that when travelling round curves or bends the buffer-rod rotates about the pivot as indicated in dash-dotted lines, whereby the drawing bolt is subjected at an incline by the tensile or impact forces (for instance P) and (as shown by the diagram of forces in the pivot 3) a component $P^n$ arises (at a right angle to the drawing bolt), which causes detrimental transverse stresses $R^1$ and $R^2$ in the bearings $F^1$ and $F^2$.

Therefore in case of stronger shocks the drawing bolts will be bent and the bearings $F^1$ $F^2$ as well as the bolt 1 are quickly worn, so that a kicking takes place when starting and braking. The spring is also detrimentally affected by the frictional forces in the bearings.

This invention relates to a drawing and pushing device which removes these drawbacks and which is illustrated by way of example on the accompanying sheet of drawings, in which—

Fig. 2 is a sectional view of the device in the direction of the axis of the vehicle.

Fig. 3 is a part sectional view of the device shown in Fig. 2, the section being taken on line $a$—$b$ of Fig. 2, and Fig. 4 is a plan view of the device.

The buffer-rod 2 is provided with a square head 5 and at 6 is reduced to a cylindric bolt 7, which is surrounded by a spring 10, disposed between two discs 8 and 9, said discs functioning as followers. A nut 11 is screwed onto the screw-threaded end of the bolt 7 and thereby a washer 12 is forced against a tubular extension $9^a$ of the disc 9, while the other disc 8 rests on the neck 6.

The square head 5 and the tubular extension $9^a$ pass through suitably shaped apertures of a hollow spherical member 15, which is snugly fitted in a spherical casing 16 but can readily rotate or turn in any direction. The said casing 16 (divided according to the horizontal central plane $x$—$y$ of Fig. 3) consists of two hemispherical members, which are fitted together by means of screw-bolts 17, passing through suitable holes in the flanges 18 of the two hemispherical members. Extensions 19, provided at both sides of the spherical casing, are furnished with holes for the insertion of screw bolts 20 which secure the whole device to the frame 21 of the vehicle.

In order to facilitate the mounting, the inner spherical member 15 is divided according to the vertical transverse plane of the device and the bottom of the said member 15 is depressed at 22 in such a manner, that a small channel 23 is formed parallel with the axis of the buffer-rod 2. The longitudinal sides of said channel 23 abut the head 24 of a rivet 25 secured in the casing 16, the said rivet-head being flattened at both sides. Said channel 23 is equal in width to the head 24 of rivet 25 (see Figure 3).

The casing 16 is provided with hollow flaring rectangular projections 30 and 31 for the passage of the buffer-rod 2 and the drawing bolt 7 respectively which (in conjunction with the channel 23 of suitable length) render possible the vertical deviations $\alpha$ and the correspondingly larger horizontal deviations $\beta$ arising during the operation, while a rotation of the buffer-rod about its axis is prevented by the flattened rivet-head 24, which closely rests against the longitudinal side walls of channels 23. As the shaft of the rivet-head is mounted freely rotatable in the casing 16, it does not prevent the deflections of the buffer-rod in the horizontal plane.

We claim:—

A drawing and pushing device for control couplings of a vehicle, comprising a spherical outer casing adapted to be secured to a vehicle, said casing having diametrically opposed openings therein, a spherical inner casing rotatably mounted within the casing, said inner casing having diametrically opposed apertures of squared cross-section adjacent to and smaller than the openings in the casing, and having a channel at the vertical axis, a buffer rod slidably mounted in the spherical inner casing and extending through the spherical outer casing, a spring mounted within the spherical inner casing concentric to the buffer-rod, followers abutting the ends of the spring to compress said spring upon axial movement of said buffer rod, and a rivet head mounted in the inner part of the vertical axis of the spherical outer casing extending into the channel in the spherical inner casing to limit the axial rotation of the buffer-rod.

In testimony whereof we affix our signatures.

ADOLF SCHRELLE.
JOHANN LENZ.